United States Patent
Miyamoto

(10) Patent No.: US 12,067,735 B2
(45) Date of Patent: Aug. 20, 2024

(54) INFORMATION PROCESSING DEVICE, ESTIMATION METHOD, AND NONTRANSITORY COMPUTER READABLE MEDIUM FOR ESTIMATING A POSITION OF A TARGET

(71) Applicant: NEC Corporation, Tokyo (JP)

(72) Inventor: Shinichi Miyamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 407 days.

(21) Appl. No.: 17/437,656

(22) PCT Filed: Mar. 19, 2019

(86) PCT No.: PCT/JP2019/011467
§ 371 (c)(1),
(2) Date: Sep. 9, 2021

(87) PCT Pub. No.: WO2020/188746
PCT Pub. Date: Sep. 24, 2020

(65) Prior Publication Data
US 2022/0164963 A1   May 26, 2022

(51) Int. Cl.
*G06T 7/246* (2017.01)
*G06T 7/70* (2017.01)

(52) U.S. Cl.
CPC .......... *G06T 7/248* (2017.01); *G06T 7/70* (2017.01); *G06T 2207/30196* (2013.01)

(58) Field of Classification Search
CPC ........ G06V 20/52; G06V 10/20; G06V 40/10; G06T 2207/30196; G06T 2207/30232; G06T 7/70
See application file for complete search history.

(56) References Cited

U.S. PATENT DOCUMENTS

2010/0008540 A1* 1/2010 Shet ............... G06V 40/103
382/103
2016/0364619 A1  12/2016 Ogata et al.
(Continued)

FOREIGN PATENT DOCUMENTS

JP  H10-255057 A   9/1998
JP  2010237872 A * 10/2010
(Continued)

OTHER PUBLICATIONS

International Search Report for PCT Application No. PCT/JP2019/011467, mailed on Jun. 25, 2019.

*Primary Examiner* — Guillermo M Rivera-Martinez
(74) *Attorney, Agent, or Firm* — Sughrue Mion, PLLC

(57) ABSTRACT

An information processing device includes a reference image generation unit that generates a reference image by using a partial area including a head of a tracking target in a whole-body image of the tracking target, a comparative image generation unit that generates a comparative image to be used for comparison with the reference image by using the partial area containing the head of the tracking target in a tracking image of the tracking target where feet are not contained, an adjustment unit that compares the reference image with the comparative image, and adjusts a position of the head of the tracking target in the comparative image, and a feet estimation unit that estimates a position of the feet of the tracking target in the tracking image by using the comparative image where the position of the head of the tracking target is adjusted.

12 Claims, 11 Drawing Sheets

(56) References Cited

U.S. PATENT DOCUMENTS

2018/0075593 A1\* 3/2018 Wang .................. G06V 40/103
2018/0165813 A1\* 6/2018 Mai .......................... G06T 7/73

FOREIGN PATENT DOCUMENTS

| JP | 2011-193187 A | | 9/2011 |
|----|---------------|---|--------|
| JP | 2012043021 A | \* | 3/2012 |
| JP | 2013-037406 A | | 2/2013 |
| JP | 2015-132879 A | | 7/2015 |
| JP | 2016-157258 A | | 9/2016 |
| JP | 2017117244 A | \* | 6/2017 |

\* cited by examiner

INFORMATION PROCESSING DEVICE, ESTIMATION METHOD, AND NONTRANSITORY COMPUTER READABLE MEDIUM FOR ESTIMATING A POSITION OF A TARGET

This application is a National Stage Entry of PCT/JP2019/011467 filed on Mar. 19, 2019, the contents of all of which are incorporated herein by reference, in their entirety.

TECHNICAL FIELD

The present disclosure relates to an information processing device, an estimation method, and a program.

BACKGROUND ART

The accuracy of person recognition has been recently improved by use of machine learning or the like for identifying a person contained in a captured image. Further, it is desired to improve the accuracy of tracking a specified person in order to enhance the security in public facilities and the like. To improve the tracing accuracy, it is necessary to specify the position of a person's feet and generate trajectory information by using the specified feet position. Patent Literature 1 discloses a height estimation device capable of accurately estimating the height of a person in an image even when the feet position of the person is hidden. In Patent Literature 1, to estimate the height of a person, a plurality of heights are assumed as the height of the person. Further, the movement trajectory of a person is generated for each of the assumed heights, and an assumed height for which the most human-like movement trajectory is generated is estimated as the height of the person.

CITATION LIST

Patent Literature

Patent Literature 1: Japanese Unexamined Patent Application Publication No. 2013-037406

SUMMARY OF INVENTION

Technical Problem

Patent Literature 1 discloses a head detection unit that specifies the head of a person in order to estimate the height of the person. However, although Patent Literature 1 describes that the head detection unit detects the head of a target person from an image by using a filter, it discloses nothing about what filter to use to accurately detect the head.

An object of the present disclosure is to provide an information processing device, an estimation method, and a program that improve the estimation accuracy of the feet position of a person whose feet position is hidden.

Solution to Problem

An information processing device according to a first aspect of the present disclosure includes a reference image generation unit configured to generate a reference image by using a partial area including a head of a tracking target in a whole-body image of the tracking target, a comparative image generation unit configured to generate a comparative image to be used for comparison with the reference image by using the partial area containing the head of the tracking target in a tracking image of the tracking target where feet are not contained, an adjustment unit configured to compare the reference image with the comparative image and adjust a position of the head of the tracking target in the comparative image, and a feet estimation unit configured to estimate a position of the feet of the tracking target in the tracking image by using the comparative image where the position of the head of the tracking target is adjusted.

An estimation method according to a second aspect of the present disclosure includes generating a reference image by using a partial area including a head of a tracking target in a whole-body image of the tracking target, generating a comparative image to be used for comparison with the reference image by using the partial area containing the head of the tracking target in a tracking image of the tracking target where feet are not contained, comparing the reference image with the comparative image and adjusting a position of the head of the tracking target in the comparative image, and estimating a position of the feet of the tracking target in the tracking image by using the comparative image where the position of the head of the tracking target is adjusted.

A program according to a third aspect of the present disclosure causes a computer to execute generating a reference image by using a partial area including a head of a tracking target in a whole-body image of the tracking target, generating a comparative image to be used for comparison with the reference image by using the partial area containing the head of the tracking target in a tracking image of the tracking target where feet are not contained, comparing the reference image with the comparative image and adjusting a position of the head of the tracking target in the comparative image, and estimating a position of the feet of the tracking target in the tracking image by using the comparative image where the position of the head of the tracking target is adjusted.

Advantageous Effects of Invention

According to the present disclosure, there are provided an information processing device, an estimation method, and a program that improve the estimation accuracy of the feet position of a person whose feet position is hidden.

DESCRIPTION OF EMBODIMENTS

First Example Embodiment

Figure 1:
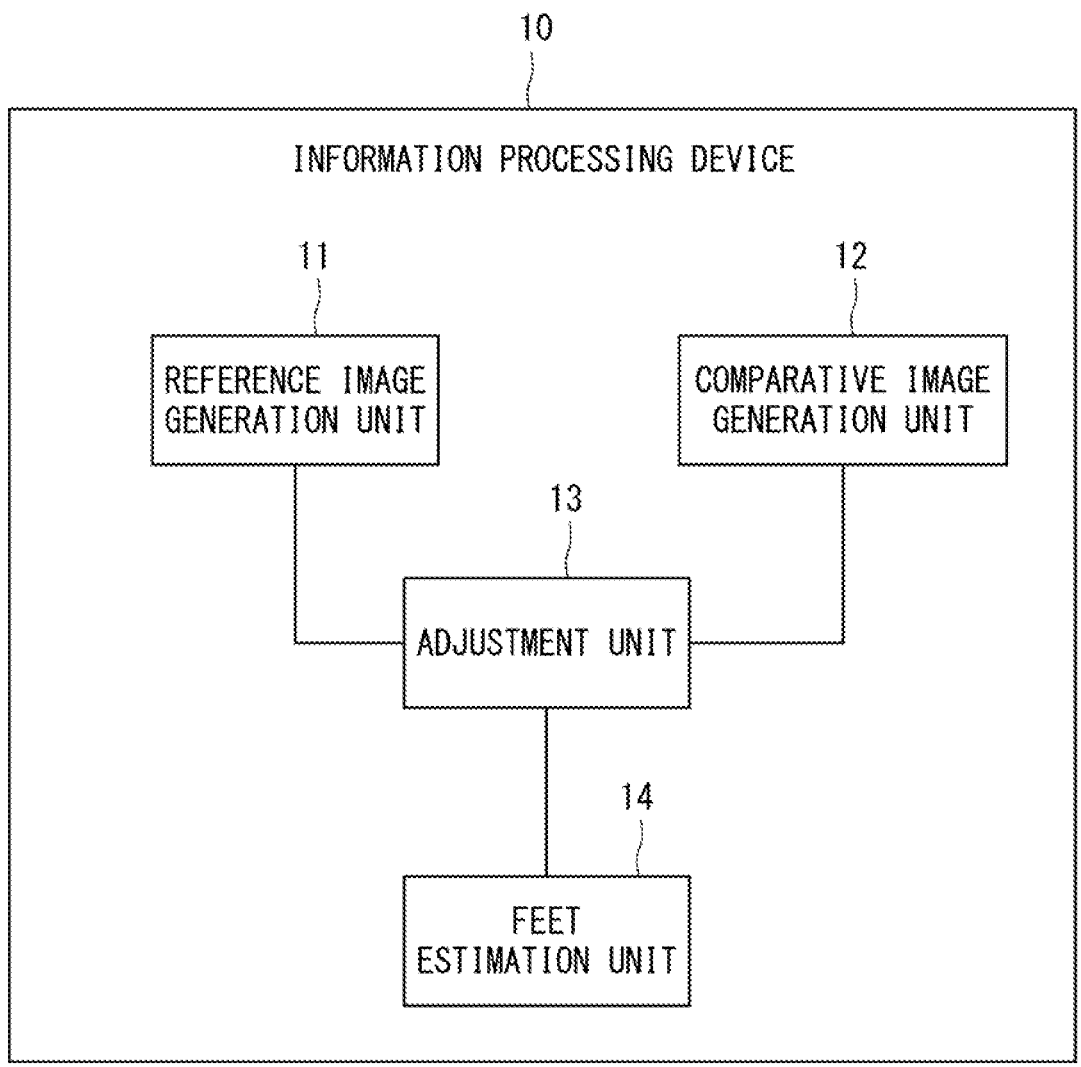
FIG. 1 is a block diagram of an information processing device according to a first example embodiment.

Example embodiments of the present disclosure will be described hereinafter with reference to the drawings. First, a configuration example of an information processing device 10 according to a first example embodiment is described with reference to FIG. 1. The information processing device 10 may be a computer device that operates when a processor executes a program stored in a memory. The information processing device 10 may be a server device.

The information processing device 10 includes a reference image generation unit 11, a comparative image generation unit 12, an adjustment unit 13, and a feet estimation unit 14. The components of the information processing device 10 such as the reference image generation unit 11, the comparative image generation unit 12, the adjustment unit 13, and the feet estimation unit 14 may be software or module whose processing is performed when a processor executes a program stored in a memory. The components of the information processing device 10 such as the reference image generation unit 11, the comparative image generation unit 12, the adjustment unit 13, and the feet estimation unit 14 may be hardware such as a circuit or a chip.

The reference image generation unit 11 generates a reference image by using a partial area containing the head of a tracking target in a whole-body image of the tracking target. The tracking target may be a person, an animal or the like, for example. The whole-body image is an image showing a tracking target from the head to the feet. The partial area containing the head of a tracking target may be an image of the upper body including the head, for example. Thus, the reference image is a smaller image than the whole-body image. In other words, the reference image is an image cut out from the whole-body image.

The whole-body image may be an image shown in a captured image captured using a camera mounted fixedly, for example. Alternatively, the whole-body image may be an image shown in a captured image taken by a person carrying a camera. The whole-body image may be extracted from the captured image as a result of image recognition. For image recognition, technology such as machine learning, deep learning, or AI (Artificial Intelligence) may be used, for example.

The comparative image generation unit 12 generates a comparative image to be used for comparison with the reference image by using a partial area containing the head of a tracking target in a tracking image of the tracking target not including the feet. The tracking image contains the tracking target shown in the whole-body image. Further, the case where the feet of a tracking target is not included may be the case where there is an obstacle in front of the feet of the tracking target, the case where the tracking target is part of a crowd or the like, for example.

The tracking image may be an image shown in a captured image captured using a camera mounted fixedly or an image shown in a captured image taken by a person carrying a camera, just like the whole-body image. Further, the tracking image may be extracted from a captured image by using image recognition technology such as machine learning, deep learning, or AI.

The comparative image may be an image of the upper body including the head of a tracking target, for example. The comparative image is a smaller image than the tracking image. In other words, the comparative image is an image cut out from the tracking image.

The adjustment unit 13 compares the reference image with the comparative image, and adjusts the head position of the tracking target in the comparative image. Adjusting the head position may be adjusting the area of the comparative image to be cut out from the tracking image in such a way that the head position in the comparative image coincides with the head position in the reference image, for example.

The feet estimation unit 14 estimates the feet position of the tracking target in the tracking image by using the comparative image where the head position of the tracking target is adjusted. For example, the feet estimation unit 14 may apply the height of the tracking target which is estimated in advance by using the whole-body image to the comparative image where the head position is adjusted to substantially the same position as that in the reference image. In this manner, the feet of the tracking target in the tracking image not including the feet of the tracking target may be estimated by using the head position and the height of the tracking target.

As described above, the information processing device 10 compares the comparative image including the head of the tracking target with the reference image including the head of the tracking target in the whole-body image, and thereby adjusts the head in the comparative image. By using the comparative image where the head position is adjusted, the estimation accuracy of the feet position in the tracking image not including the feet is improved.

Second Example Embodiment

A reference image creation process according to a second example embodiment is described hereinafter with reference to FIGS. 2 and 3. It is assumed that the information processing device 10 described with reference to FIG. 1 is used also in the second example embodiment.

Figure 2:
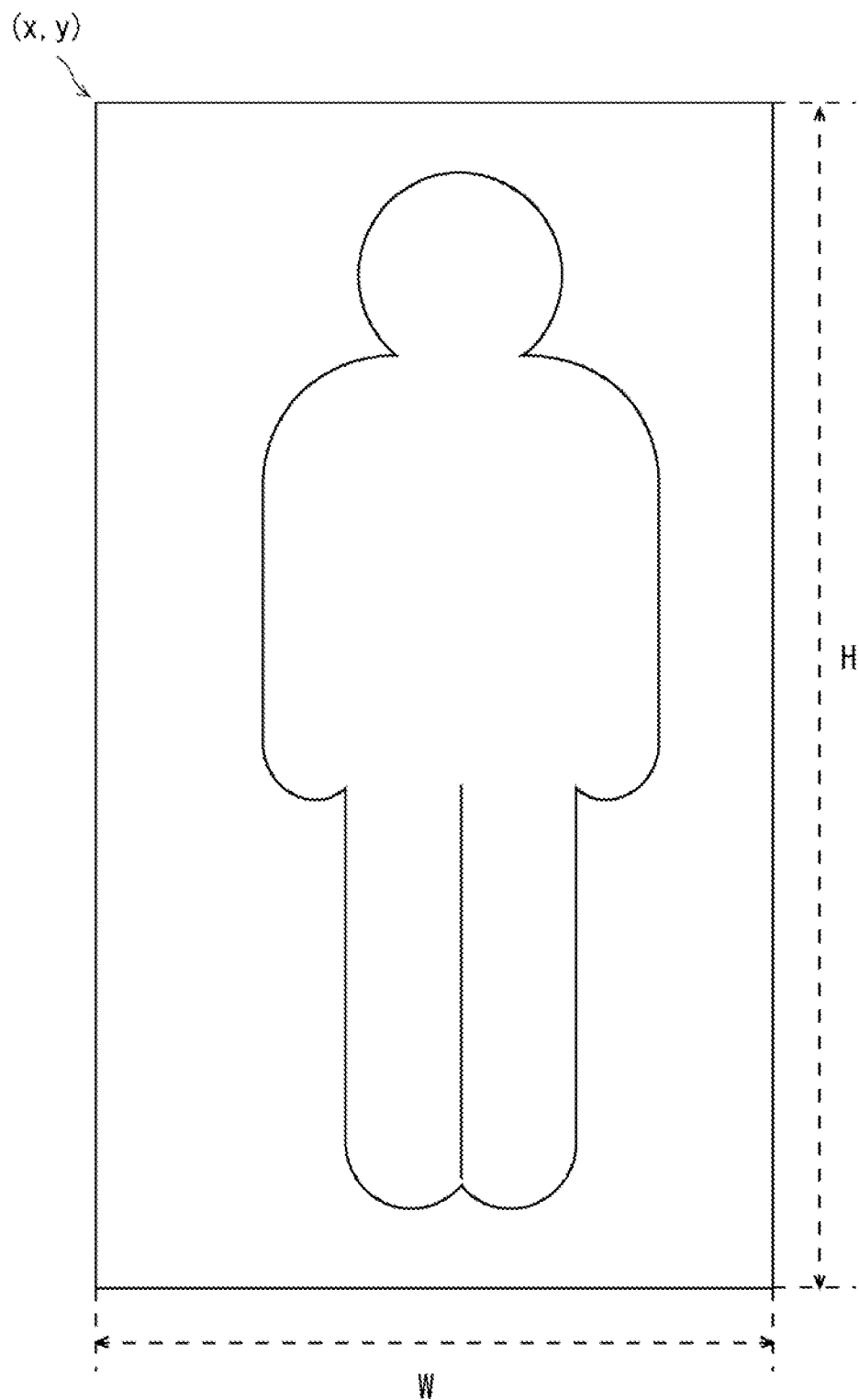
FIG. 2 is a view illustrating a whole-body image according to a second example embodiment.

FIG. 2 shows a whole-body image of a tracking target. The information processing device 10 includes a captured image captured using a camera built in the information processing device 10. Alternatively, the information processing device 10 may acquire a captured image captured using a camera through a network, or acquire a captured image from a recording medium storing a captured image. The whole-body image may be an image extracted as a result of image recognition on a captured image, for example. It is assumed that deep learning, for example, is used as image recognition.

As shown in FIG. 2, the whole-body image is shown using a person as a tracking target and a frame surrounding the person. The length of the frame in the horizontal direction is W, and the length of the frame in the vertical direction is H. The length from the person to the frame is not particularly specified, and it is different depending on the detection accuracy of the tracking target with use of deep learning. Specifically, the distance from the head position of the tracking target to the upper end of the frame varies each time the whole-body image is extracted. Further, the distance from the feet position of the tracking target to the lower end of the frame varies each time the whole-body image is extracted.

Further, when the head position in the whole-body image overlaps the upper end of the frame or a part of the head position is not shown, the reference image generation unit 11 may make an adjustment such as shifting the frame position of the whole-body image upward. For example, when the coordinates of the position of the upper left vertex of the frame are (X, Y), the reference image generation unit 11 may adjust the frame position by changing the value of X or Y. The coordinates of a vertex of the frame may be defined using a pixel position in the captured image or the whole-body image, for example.

Further, in the case where the tracking target is not shown from the head to the feet even after shifting the frame position of the whole-body image, the reference image generation unit 11 may extract the whole-body image from the captured image again.

Further, the reference image generation unit 11 estimates the height of the tracking target contained in the whole-body image. For example, the reference image generation unit 11 may estimate the length H of the frame in the vertical direction as the height of the tracking target.

Figure 3:
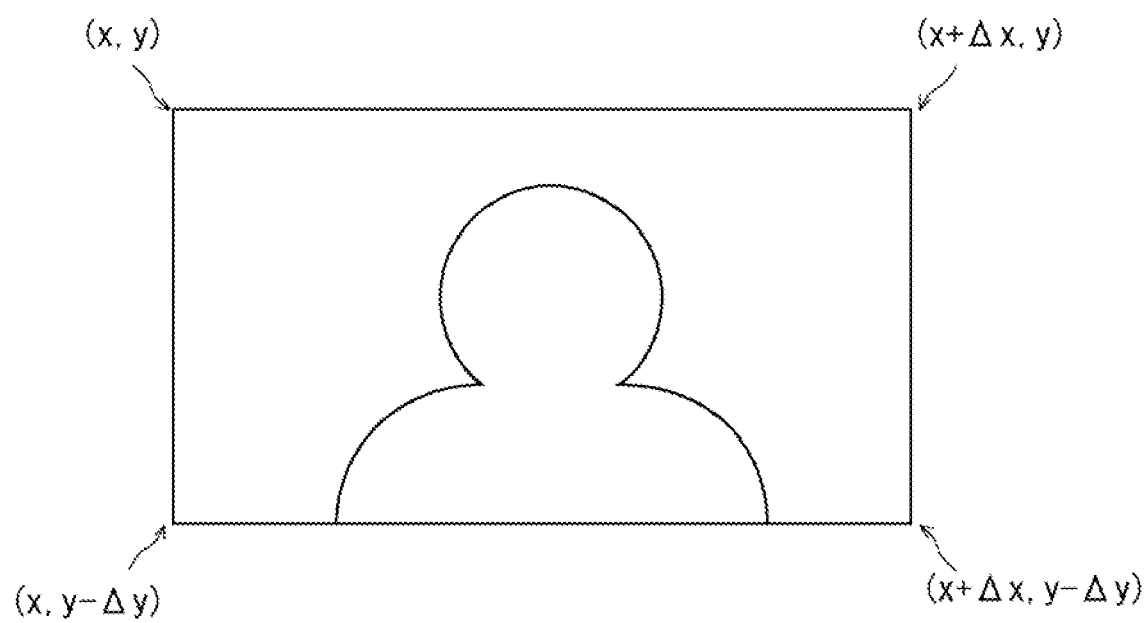
FIG. 3 is a view illustrating a reference image according to the second example embodiment.

FIG. 3 shows a reference image of a tracking target. The reference image generation unit 11 generates the reference image by cutting out a partial area containing the head from the whole-body image shown in FIG. 2. The upper end of the reference image and the upper end of the whole-body image may coincide with each other. Cutting out a partial area containing the head is, in other words, extracting a partial area containing the head. For example, as shown in FIG. 3, the reference image generation unit 11 may define the coordinates of the vertices of the reference image as (X,Y), (X+ΔX,Y), (X,Y−ΔY), (X+ΔX,Y−ΔY). The values of ΔX and ΔY may be determined in advance. Alternatively, the reference image generation unit 11 may define the area of the reference image extracted from the whole-body image by using deep learning. The coordinates of the reference image are the coordinates on the XY plane defined using the X-axis and the Y-axis that are orthogonal to each other, for example.

A comparison image creation process according to the second example embodiment is described hereinafter with reference to FIGS. 4 and 5.

Figure 4:
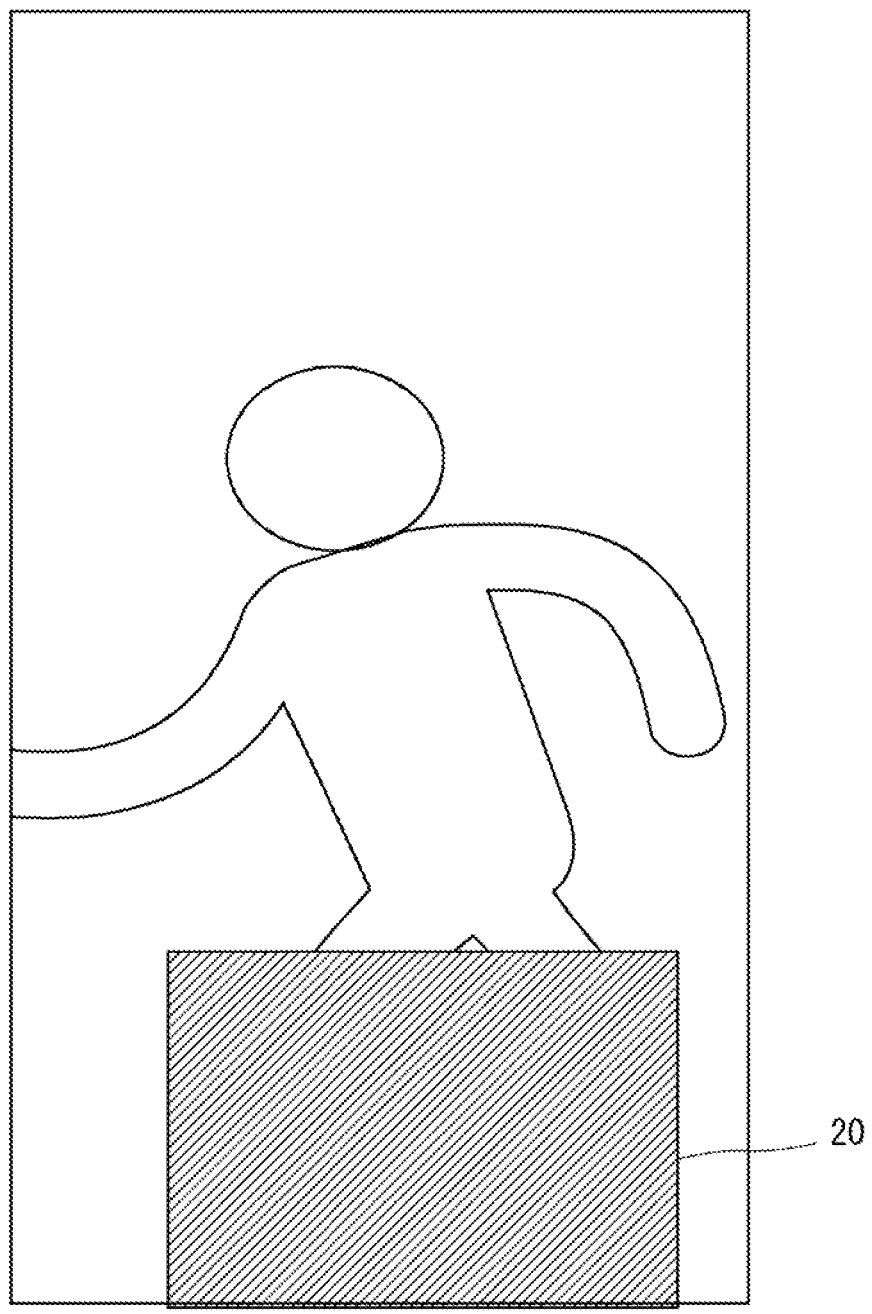
FIG. 4 is a view illustrating a tracking image according to the second example embodiment.

FIG. 4 shows a tracking image of a tracking target. The tracking image may be an image extracted as a result of image recognition on a captured image, for example. It is assumed that deep learning, for example, is used as image recognition. For extraction of the tracking image, the captured image captured at timing after the captured image used for extraction of the whole-body image is used. The tracking target shown in the tracking image is the same person as the tracking target shown in the whole-body image of FIG. 2. For example, the comparative image generation unit 12 specifies, in the captured image, the same person as the tracking target shown in the whole-body image of FIG. 2 by using deep learning, and extracts the tracking image containing the specified person from the captured image. Further, the tracking image of FIG. 4 shows that the feet of the tracking target are hidden by an obstacle 20.

FIG. 4 shows a comparative image of a tracking target. The comparative image generation unit 12 generates the comparative image by cutting out a partial area containing the head from the tracking image shown in FIG. 4. The upper end of the comparative image and the upper end of the tracking image may coincide with each other. For example, as shown in FIG. 5, the comparative image generation unit 12 may define the coordinates of the vertices of the comparative image as (a,b), (a+Δa,b), (a,b−Δb), (a+Δa,b−Δb). The values of Δa and Δb may be determined in advance. Alternatively, the comparative image generation unit 12 may define the area of the comparative image extracted from the tracking image by using deep learning.

Figure 5:
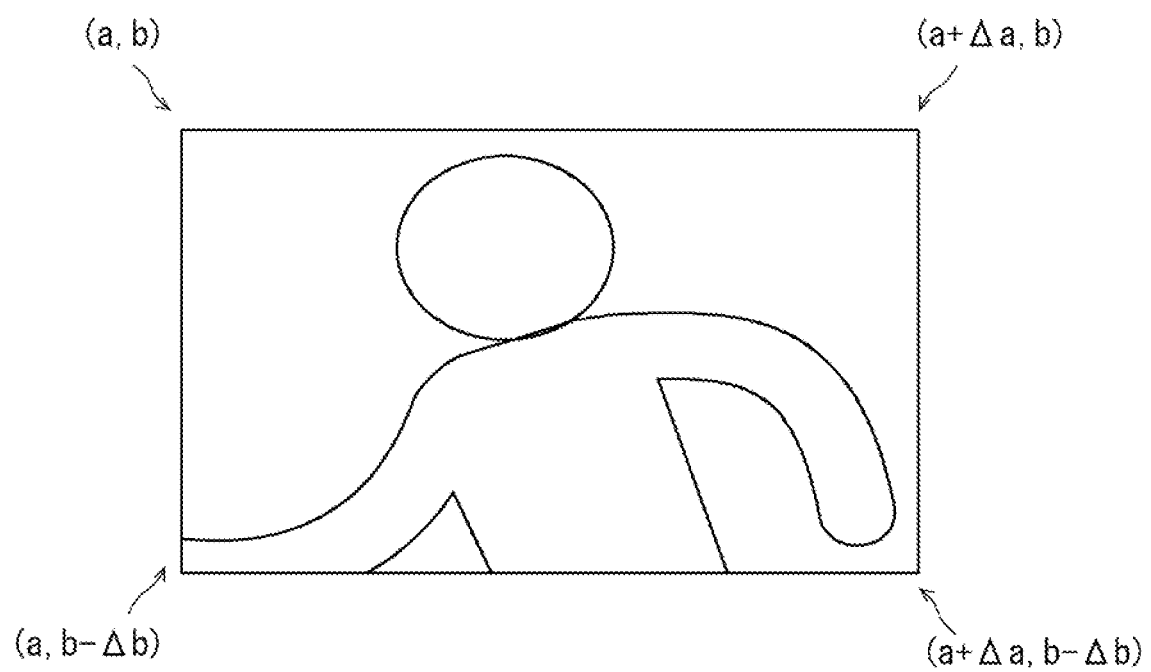
FIG. 5 is a view illustrating a comparative image according to the second example embodiment.

The adjustment unit 13 compares the reference image in FIG. 3 with the comparative image in FIG. 5 and adjusts the head position of the tracking target. For example, the adjustment unit 13 makes an adjustment of the comparative image according to the degree of similarity between the reference image and the comparative image. For example, when comparing the reference image in FIG. 3 and the comparative image in FIG. 5, the distance from the head to the upper end of the frame is shorter in the comparative image than in the reference image. In such a case, a difference between the position of the tracking target in the comparative image and the position of the tracking target in the reference image is large, and therefore the similarity between the reference image and the comparative image is low.

The reference image and the comparative image are performed using SAD (Sum of Absolute Differences), normalized correlation, a figure formed by connecting feature points of a person's parts or the like, for example. In the case of using SAD, for example, the adjustment unit 13 calculates the absolute value of a difference in luminance between a pixel of the reference image and a pixel of the comparative image at the same position as the pixel of the reference image. Further, when the sum of absolute values of differences in luminance between corresponding pairs of pixels is less than a predetermined threshold, the adjustment unit 13 determines that the reference image and the comparative image are similar.

In the case of using normalized correlation, the adjustment unit 13 calculates the inner product of a pixel of the reference image and a pixel of the comparative image at the same position as the pixel of the reference image. The adjustment unit 13 then normalizes the calculated inner product and determines whether the reference image and the comparative image are similar or not by using this normalized value.

A figure formed by connecting feature points of a person's parts may be a triangle whose vertices are two eyes and a nose, for example. The adjustment unit 13 may determine the similarity between the reference image and the comparative image on the basis of the area, the total length of the three sides or the like of the triangle in each of the reference image and the comparative image.

The adjustment unit 13 adjusts the position of the tracking target in the comparative image by translating, enlarging or shrinking the frame in the comparative image so that the similarity meets predetermined criteria. The head position of the tracing target is determined when the reference image and the comparative image meet predetermined criteria for the similarity. Translating, enlarging or shrinking may be done by changing the coordinates of the vertices of the frame of the comparative image.

Figure 6:
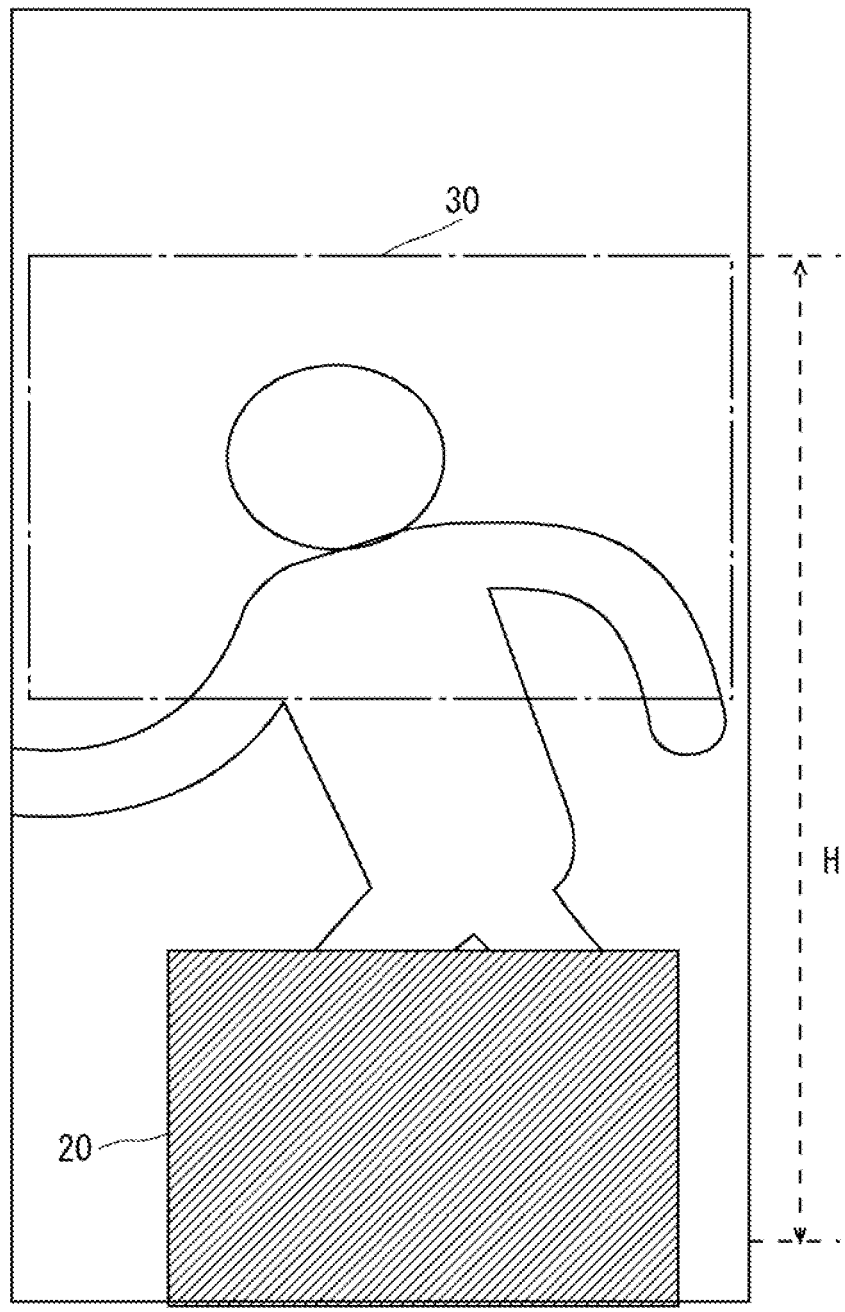
FIG. 6 is a view illustrating a whole-body image according to the second example embodiment.

The feet estimation unit 14 estimates the feet position of the tracking target by using the comparative image where the cutout position from the tracking image is adjusted. The cutout position from the tracking image is, in other words, the position of the comparative image in the tracking image. For example, as shown in FIG. 6, the feet estimation unit 14 may estimate that the position that is shifted from the upper end of a comparative image 30 in the tracking image in the direction of the lower end by the length of the height H of the tracking target estimated by the reference image generation unit 11 is the feet position of the tracking target. FIG. 6 shows a cutout position of the comparative image 30 in the tracking image. Specifically, FIG. 6 shows the area of the comparative image 30 where the cutout position is adjusted. The position of the tracking target in the comparative image 30 substantially coincides with the position of the tracking target in the reference image. Thus, by determining the position of the comparative image 30 in the tracking image, the feet position of the tracking target in the tracking image can be estimated by using information about the height of the tracking target estimated using the whole-body image.

Figure 7:
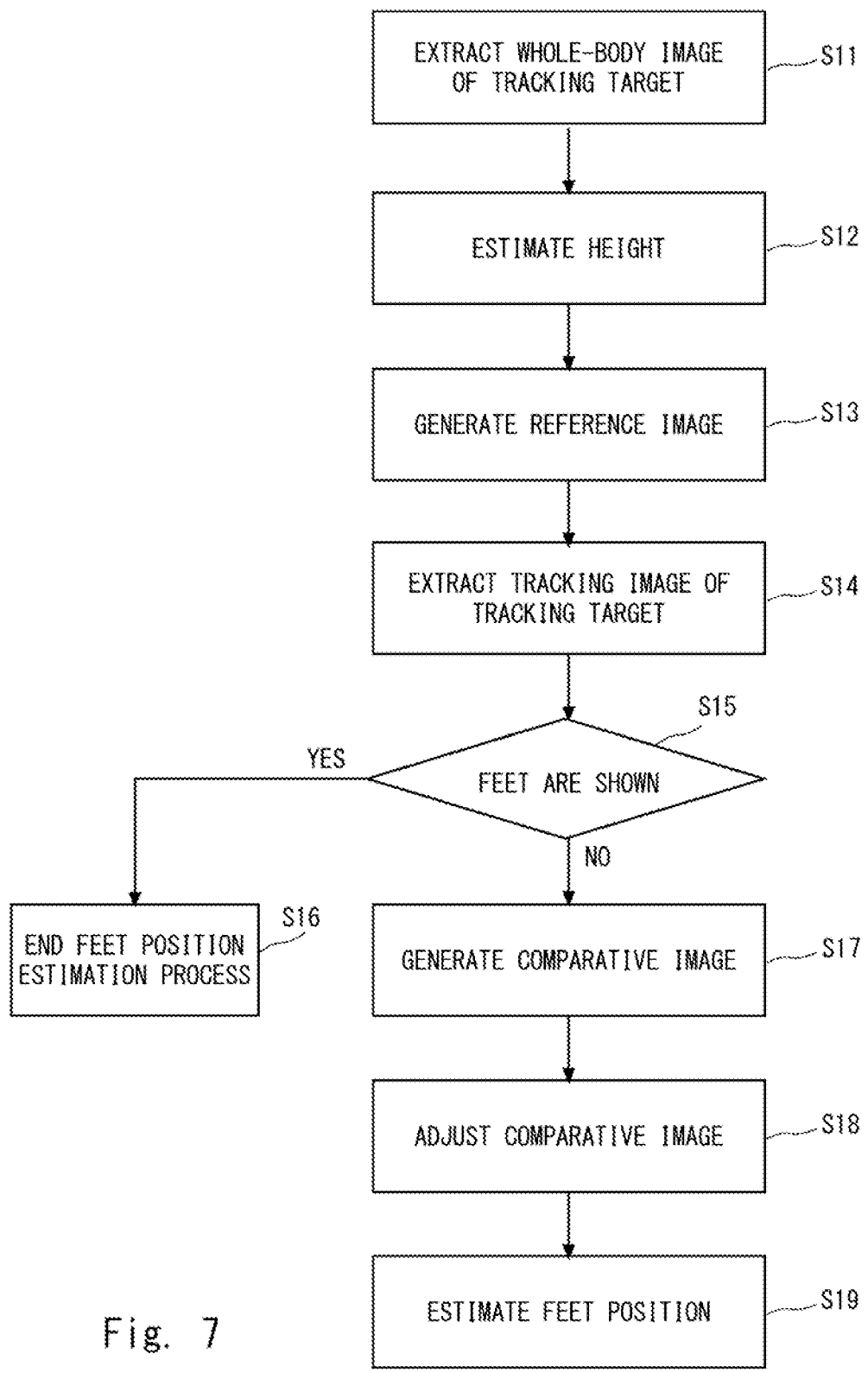
FIG. 7 is a view showing the flow of a feet position estimation process according to the second example embodiment.

The flow of a feet position estimation process according to the second example embodiment is described hereinafter with reference to FIG. 7. First, the reference image generation unit 11 extracts the whole-body image of a tracking target from the captured image captured using a camera or the like (S11). Next, the reference image generation unit 11 estimates the height of the tracking target (S12). For example, the reference image generation unit 11 may estimate the vertical length H of the whole-body image as the height of the tracking target.

The reference image generation unit 11 then cuts out the area containing the head of the tracking target in the whole-body image and thereby generates the reference image (S13). For example, the reference image generation unit 11 may generate the reference image so as to contain the upper end of the whole-body image and the head of the tracking target.

Then, the comparative image generation unit 12 extracts the tracking image containing the tracking target from the captured image captured using a camera or the like (S13). The comparative image generation unit 12 then determines whether the feet of the tracking target are shown in the tracking image (S15). For example, the comparative image generation unit 12 may determine whether the feet are shown or not by using deep learning or the like.

When the comparative image generation unit 12 determines that the feet of the tracking target are shown in the tracking image, it ends the feet position estimation process (S16). When, on the other hand, the comparative image generation unit 12 determines that the feet of the tracking target are not shown in the tracking image, it generates the comparison image (S17). The comparative image generation unit 12 cuts out the area containing the head of the tracking target in the tracking image and thereby generates the comparative image. For example, the comparative image generation unit 12 may generate the comparative image so as to contain the upper end of the tracking image and the head of the tracking target.

After that, the adjustment unit 13 compares the reference image with the comparative image, and adjusts the frame position of the comparative image so that the head position of the tracking target in the comparative image coincides with the head position of the tracking target in the reference image (S18). Then, the feet estimation unit 14 estimates the feet position not shown in the tracking image by using the adjusted comparative image (S19).

As described above, the information processing device 10 can generate the reference image and the comparative image from the whole-body image and the tracking image extracted using deep learning. The information processing device 10 can estimate the feet position of the tracking target in the tracking image where the feet are not shown after adjusting the position of the tracking target in the comparative image so as to coincide with that in the reference image.

As a result of making an adjustment so that the reference image and the comparative image coincide with each other, the head position of the tracking target in the tracking image corresponds to the position in the whole-body image. The information processing device 10 can thereby estimate the feet position of the tracking target by using the head position of the tracking target in the tracking image and the height estimated from the whole-body image.

Third Example Embodiment

Figure 8:
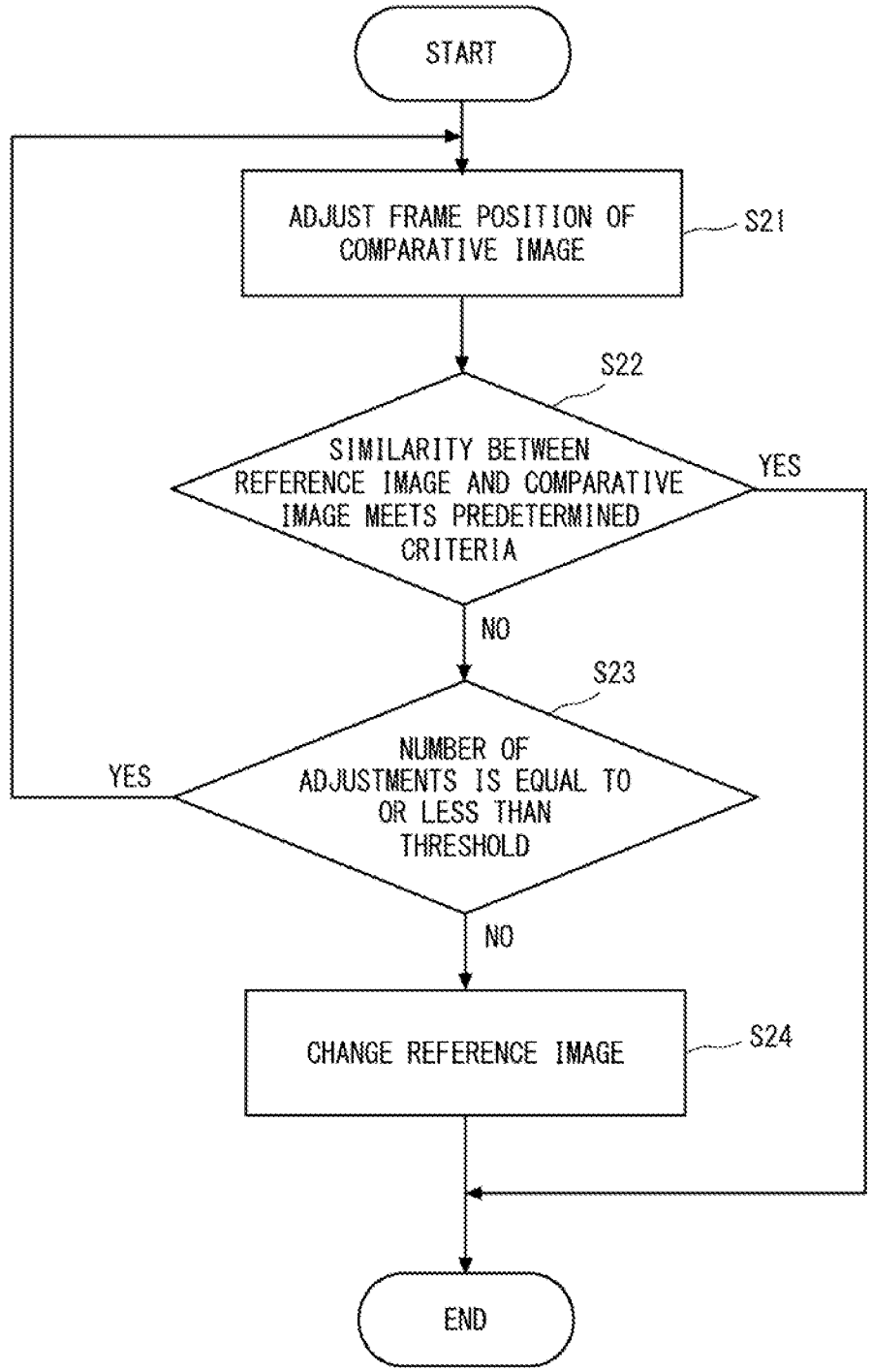
FIG. 8 is a view showing the flow of a comparative image adjustment process according to a third example embodiment.

The flow of a reference image update process is described hereinafter with reference to FIG. 8. FIG. 8 shows the details of a comparative image adjustment process in Step S18 in FIG. 7.

First, the adjustment unit 13 adjusts the frame position of the comparative image (S21). Next, the adjustment unit 13 determines whether the similarity between the reference image and the comparative image meets predetermined criteria (S22). SAD or the like, for example, may be used for the determination as to whether the similarity between the reference image and the comparative image meets predetermined criteria. When the adjustment unit 13 determines that the similarity between the reference image and the comparative image meets predetermined criteria, the process ends. When, on the other hand, the adjustment unit 13 determines that the similarity between the reference image and the comparative image does not meet predetermined criteria, it determines whether the number of adjustments is equal to or less than a threshold (S23). When the adjustment unit 13 determines that the number of adjustments is equal to or less than a threshold, the process returns to Step S21, and the adjustment unit 13 adjusts the frame position of the comparative image (S21). In this manner, when the similarity between the reference image and the comparative image does not meet predetermined criteria, the adjustment unit 13 repeats the adjustment of the frame position of the comparative image.

In Step S23, when the adjustment unit 13 determines that the number of adjustments exceeds a threshold, it changes the reference image to the comparative image (S24). The case where the similarity between the reference image and the comparative image does not meet criteria even when the number of adjustments exceeds a predetermined threshold is the case where there is a significant change of the tracking target shown in the comparative image from the reference image. In such a case, the adjustment unit 13 updates the reference image to the comparative image. The case where there is a significant change of the tracking target shown in the comparative image from the reference image is the case where the direction in which the tracking target shown in the comparative image faces and the direction in which the tracking target shown in the reference image faces are different, for example.

The case where the adjustment unit 13 does not change the reference image is described hereinafter. For example, it is assumed that another person, other than the tracking target, is also extracted in the tracking image at the same time. In other words, it is assumed that a plurality of persons including the tracking target are extracted in an overlapping manner in the tracking image. It is likely that the person other than the tracking target is also shown in the comparison image cut out from this tracking image. Therefore, the adjustment unit 13 may refrain from changing the reference image to the comparison image generated from the tracking image in which a plurality of persons are extracted in an overlapping manner.

As described above, in the case where a change of the tracking target is large compared with when the reference image is generated, the reference image is changed to the comparative image, and thereby the head of the tracking target is adjusted accordingly. As a result, the feet estimation unit 14 can use the reference image in line with the current motion of the tracking target, which improves the estimation accuracy of the feet position of the tracking target.

Fourth Example Embodiment

Figure 9:
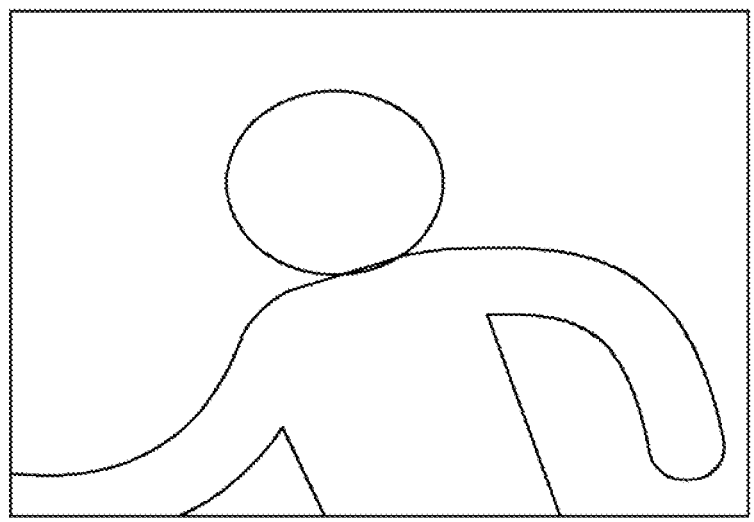
FIG. 9 is a view illustrating a tracking image according to a fourth example embodiment.

A feet estimation process according to a fourth example embodiment is described hereinafter. The comparative image generation unit 12 extracts the vertically long rectangular tracking image shown in FIG. 4 in some cases, and extracts a tracking image that is more like the shape of the reference image generated in FIG. 3 as shown in FIG. 9 in other cases. For example, the comparative image generation unit 12 may enlarge the area of the comparative image occupying the tracking image as the shape of the tracking image becomes more like the shape of the reference image generated in FIG. 3. For example, when the shape of the tracking image is substantially the same as the shape of the reference image, the tracking image may be used as the comparative image. Further, when the shape of the tracking image is a vertically long rectangle, the area above the shoulder including the head in the tracking image may be used as the comparative image.

The comparative image generation unit 12 may determine whether the shape of the tracking image becomes more like the shape of the reference image by using an aspect ratio. For example, the aspect ratio may be calculated as H/W with the vertical length H and the horizontal length W of the tracking image and the reference image. The comparative image generation unit 12 may enlarge the area of the comparative image occupying the tracking image as the aspect ratio of the tracking image becomes closer to the aspect ratio of the reference image.

Figure 10:
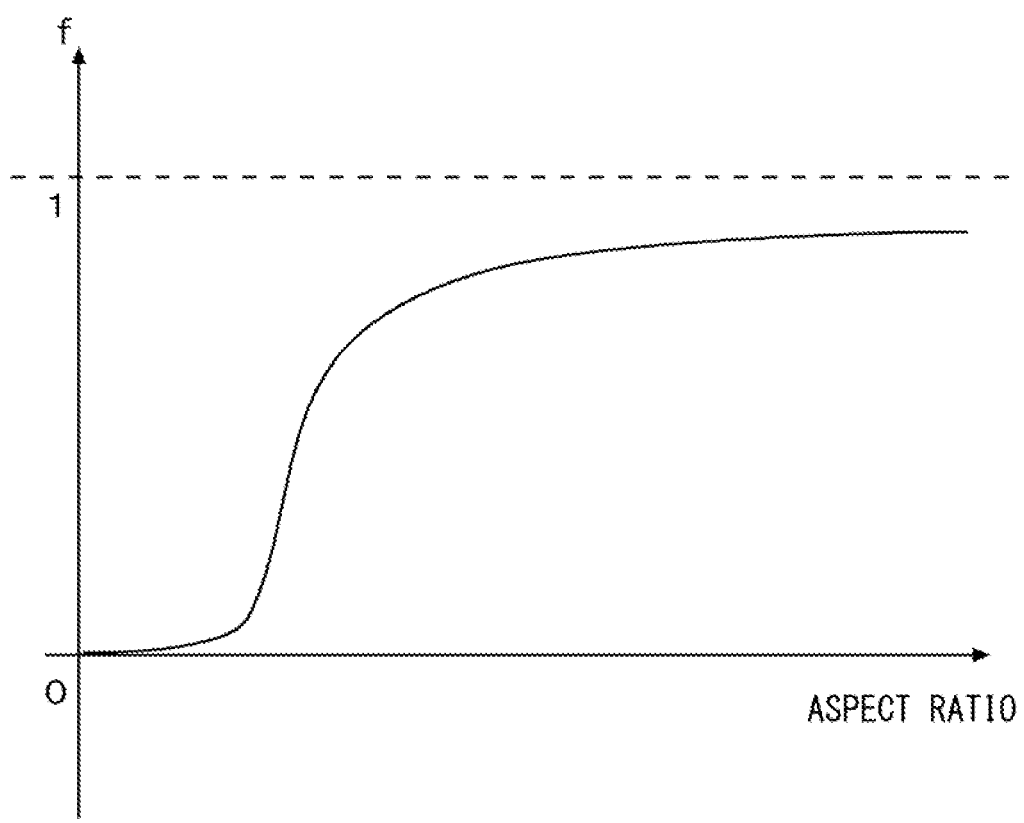
FIG. 10 is a view illustrating a sigmoid function used for feet estimation according to the fourth example embodiment.

Further, the feet estimation unit 14 may calculate the estimated position of the feet on the basis of the aspect ratio of the tracking image. For example, it is assumed that the vertical length of the whole-body image having a vertically long rectangular shape is Y1, and the height of the tracking target estimated from the whole-body image is also Y1. It is also assumed that the vertical length of the tracking image is Y2. Further, a function f whose value becomes closer to 0 as the aspect ratio of the tracking image becomes closer to 0, i.e., as the tracking image becomes more like a horizontally long rectangle after becoming a square from a vertically long rectangle, is defined. It is assumed that the value of this function becomes closer to 1 as the aspect ratio of the tracking image becomes greater. For the function f, the sigmoid function shown in FIG. 10 may be used. In FIG. 10, the horizontal axis indicates the aspect ratio of the tracking image, and the vertical axis indicates the value of the function f.

The feet estimation unit 14 may define the estimated height Y3 as represented by the following equation 1.

$$Y3=(1-f) \times Y1 + f \times Y2 \qquad \text{Equation 1}$$

Equation 1 represents that the value of the estimated height Y3 becomes closer to the vertical length Y2 of the tracking image as the aspect ratio of the tracking image becomes larger, and the value of the estimated height Y3 becomes closer to the vertical length of the whole-body image as the aspect ratio of the tracking image becomes smaller.

The case where the aspect ratio of the tracking image is large is regarded as when the aspect ratios of the tracking image and the whole-body image are close values. In this case, the value of the estimated height Y3 becomes closer to the vertical length Y2 of the tracking image. The case where the aspect ratio is small is regarded as when a difference between the aspect ratios of the tracking image and the whole-body image is large. In this case, the value of the estimated height Y3 becomes closer to the height Y1 estimated using the whole-body image.

As described above, using the feet estimation process according to the fourth example embodiment allows estimating the feet position of the tracking target from the tracking image in various shapes. In other words, using the feet estimation process according to the fourth example embodiment allows estimating the feet position of the tracking target from the tracking image with a different aspect ratio from the whole-body image.

Figure 11:
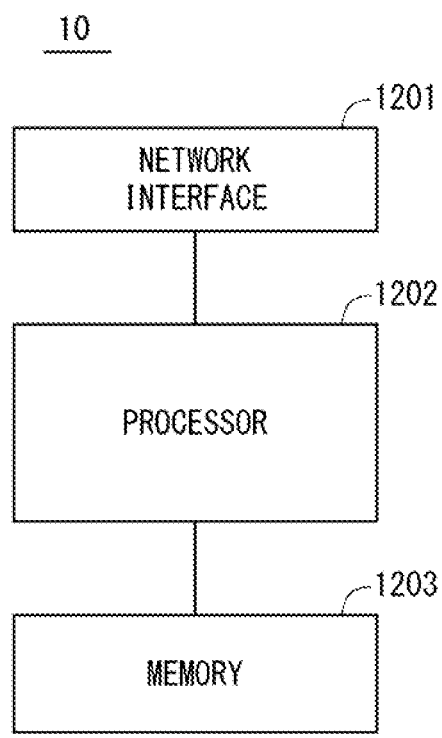
FIG. 11 is a block diagram of an information processing device according to each example embodiment.

FIG. 11 is a block diagram showing a configuration example of the information processing device 10. Referring to FIG. 11, the information processing device 10 includes a network interface 1201, a processor 1202, and a memory 1203. The network interface 1201 is used to communicate with another network node that constitutes the communication system. The network interface 1201 may be used to perform radio communication. For example, the network interface 1201 may be used to perform wireless LAN communication defined by IEEE 802.11 series or mobile communication defined by 3GPP (3rd Generation Partnership Project). Alternatively, the network interface 1201 may include a network interface card (NIC) that complies with the IEEE 802.3 series, for example.

The processor 1202 reads and runs software (computer program) from the memory 1203 and thereby executes processing of the information processing device 10 that is described with reference to the flowchart or the sequence chart in the example embodiments described above. The processor 1202 may be a microprocessor, an MPU (Micro Processing Unit) or a CPU (Central Processing Unit), for example. The processor 1202 may include a plurality of processors.

The memory 1203 is a combination of a volatile memory and a nonvolatile memory. The memory 1203 may include a storage that is placed apart from the processor 1202. In this case, the processor 1202 may access the memory 1203 through an I/O interface, which is not shown.

In the example of FIG. 11, the memory 1203 is used to store a group of software modules. The processor 1202 performs the processing of the information processing device 10 described in the above example embodiments by reading the group of software modules from the memory 1203 and executing them.

As described with reference to FIG. 11, each of processors included in the information processing device 10 runs one or a plurality of programs including a group of instructions for causing a computer to perform the algorithms described using the drawings.

In the above-described examples, the program can be stored and provided to a computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

Note that the present disclosure is not limited to the above-described example embodiments and can be modified as appropriate without departing from the spirit and scope of the present disclosure. Further, the present disclosure may be implemented by combining the above-described example embodiments with one another.

The whole or part of the example embodiments disclosed above can be described as, but not limited to, the following supplementary notes.

(Supplementary Note 1)

An information processing device comprising:
  a reference image generation means for generating a reference image by using a partial area including a head of a tracking target in a whole-body image of the tracking target;
  a comparative image generation means for generating a comparative image to be used for comparison with the reference image by using the partial area containing the head of the tracking target in a tracking image of the tracking target where feet are not contained;
  an adjustment means for comparing the reference image with the comparative image, and adjusting a position of the head of the tracking target in the comparative image; and
  a feet estimation means for estimating a position of the feet of the tracking target in the tracking image by using the comparative image where the position of the head of the tracking target is adjusted.

(Supplementary Note 2)

The information processing device according to Supplementary note 1, wherein the adjustment means adjusts the position of the head of the tracking target in the comparative image so as to coincide with the position of the head of the tracking target in the reference image.

(Supplementary Note 3)

The information processing device according to Supplementary note 1 or 2, wherein the comparative image generation means generates the comparative image on the basis of an aspect ratio determined by a vertical length and a horizontal length of the tracking image.

(Supplementary Note 4)

The information processing device according to Supplementary note 3, wherein when the aspect ratio indicates that the vertical length is longer than the horizontal length, the comparative image generation means reduces an area of the comparative image occupying the tracking image compared with when the aspect ratio indicates that the vertical length is shorter than the horizontal length.

(Supplementary Note 5)

The information processing device according to any one of Supplementary notes 1 to 4, wherein the feet estimation means estimates the position of the feet of the tracking target by using a height of the tracking target estimated using the whole-body image.

(Supplementary Note 6)

The information processing device according to Supplementary note 5, wherein the feet estimation means estimates the position of the feet of the tracking target by using the position of the feet of the tracking target estimated using the height of the tracking target, a position of a lower end of the tracking image, and weighting factors by which the estimated position of the feet of the tracking target and the position of the lower end of the tracking image are to be multiplied respectively.

(Supplementary Note 7)

The information processing device according to Supplementary note 6, wherein the feet estimation means estimates the position of the feet of the tracking target on the basis of an aspect ratio determined by a vertical length and a horizontal length of the tracking image.

(Supplementary Note 8)

The information processing device according to Supplementary note 7, wherein as the vertical length of the tracking image becomes longer than the horizontal length of the tracking image, the feet estimation means reduces a value of the weighting factor by which the estimated position of the feet of the tracking target is to be multiplied and increases a value of the weighting factor by which the position of the lower end of the tracking image is to be multiplied.

(Supplementary Note 9)

The information processing device according to any one of Supplementary notes 1 to 8, wherein when the adjustment means determines that the reference image and the comparative image do not coincide on the basis of predetermined criteria, the adjustment means replaces the reference image with the comparative image.

(Supplementary Note 10)

The information processing device according to Supplementary note 9, wherein in a case where a tracking image of another person overlaps the tracking image, the adjustment means does not replace the reference image with the comparative image even when the adjustment means determines that the reference image and the comparative image do not coincide on the basis of predetermined criteria.

(Supplementary Note 11)

An estimation method in an information processing device comprising:
  generating a reference image by using a partial area including a head of a tracking target in a whole-body image of the tracking target;
  generating a comparative image to be used for comparison with the reference image by using the partial area containing the head of the tracking target in a tracking image of the tracking target where feet are not contained;
  comparing the reference image with the comparative image, and adjusting a position of the head of the tracking target in the comparative image; and
  estimating a position of the feet of the tracking target in the tracking image by using the comparative image where the position of the head of the tracking target is adjusted.

(Supplementary Note 12)

A non-transitory computer readable medium storing a program causing a computer to execute:
  generating a reference image by using a partial area including a head of a tracking target in a whole-body image of the tracking target;
  generating a comparative image to be used for comparison with the reference image by using the partial area containing the head of the tracking target in a tracking image of the tracking target where feet are not contained;
  comparing the reference image with the comparative image, and adjusting a position of the head of the tracking target in the comparative image; and estimating a position of the feet of the tracking target in the tracking image by using the comparative image where the position of the head of the tracking target is adjusted.

Note that the present disclosure is not limited to the above-described example embodiments and can be modified as appropriate without departing from the spirit and scope of the present disclosure.

REFERENCE SIGNS LIST

10 INFORMATION PROCESSING DEVICE
11 REFERENCE IMAGE GENERATION UNIT
12 COMPARATIVE IMAGE GENERATION UNIT
13 ADJUSTMENT UNIT
14 FEET ESTIMATION UNIT
20 OBSTACLE

What is claimed is:

1. An information processing device comprising:
at least one memory storing instructions, and
at least one processor configured to execute the instructions to:
generate a reference image by using a partial area including a head of a tracking target in a whole-body image of the tracking target;
generate a comparative image to be used for comparison with the reference image by using the partial area containing the head of the tracking target in a tracking image of the tracking target where feet of the tracking target are not contained;
compare the reference image with the comparative image, and adjusting a position of the head of the tracking target in the comparative image; and
estimate a position of the feet of the tracking target in the tracking image by using the comparative image where the position of the head of the tracking target is adjusted.

2. The information processing device according to claim 1, wherein the at least one processor is further configured to execute the instructions to adjust the position of the head of the tracking target in the comparative image so as to coincide with the position of the head of the tracking target in the reference image.

3. The information processing device according to claim 1, wherein the at least one processor is further configured to execute the instructions to generate the comparative image on the basis of an aspect ratio determined by a vertical length and a horizontal length of the tracking image.

4. The information processing device according to claim 3, wherein when the aspect ratio indicates that the vertical length is longer than the horizontal length, the at least one processor is further configured to execute the instructions to reduce an area of the comparative image occupying the tracking image compared with when the aspect ratio indicates that the vertical length is shorter than the horizontal length.

5. The information processing device according to claim 1, wherein the at least one processor is further configured to execute the instructions to estimate the position of the feet of the tracking target by using a height of the tracking target estimated using the whole-body image.

6. The information processing device according to claim 5, wherein the at least one processor is further configured to execute the instructions to estimate the position of the feet of the tracking target by using the position of the feet of the tracking target estimated using the height of the tracking target, a position of a lower end of the tracking image, and weighting factors by which the estimated position of the feet of the tracking target and the position of the lower end of the tracking image are to be multiplied respectively.

7. The information processing device according to claim 6, wherein the at least one processor is further configured to execute the instructions to estimate the position of the feet of the tracking target on the basis of an aspect ratio determined by a vertical length and a horizontal length of the tracking image.

8. The information processing device according to claim 7, wherein as the vertical length of the tracking image becomes longer than the horizontal length of the tracking image, the at least one processor is further configured to execute the instructions to reduce a value of the weighting factor by which the estimated position of the feet of the tracking target is to be multiplied and increases a value of the weighting factor by which the position of the lower end of the tracking image is to be multiplied.

9. The information processing device according to claim 1, wherein when the reference image and the comparative image do not coincide on the basis of Sum of Absolute Differences, normalized correlation or a figure formed by connecting feature points of a person's parts, the at least one processor is further configured to execute the instructions to replace the reference image with the comparative image.

10. The information processing device according to claim 9, wherein in a case where a tracking image of another person overlaps the tracking image, the at least one processor is further configured to execute the instructions not to replace the reference image with the comparative image even when the reference image and the comparative image do not coincide on the basis of the Sum of Absolute Differences, the normalized correlation or the figure formed by connecting feature points of a person's parts.

11. An estimation method in an information processing device comprising:
generating a reference image by using a partial area including a head of a tracking target in a whole-body image of the tracking target;
generating a comparative image to be used for comparison with the reference image by using the partial area containing the head of the tracking target in a tracking image of the tracking target where feet of the tracking target are not contained;
comparing the reference image with the comparative image, and adjusting a position of the head of the tracking target in the comparative image; and
estimating a position of the feet of the tracking target in the tracking image by using the comparative image where the position of the head of the tracking target is adjusted.

12. A non-transitory computer readable medium storing a program causing a computer to execute:
generating a reference image by using a partial area including a head of a tracking target in a whole-body image of the tracking target;
generating a comparative image to be used for comparison with the reference image by using the partial area containing the head of the tracking target in a tracking image of the tracking target where feet of the tracking target are not contained;
comparing the reference image with the comparative image, and adjusting a position of the head of the tracking target in the comparative image; and estimating a position of the feet of the tracking target in the tracking image by using the comparative image where the position of the head of the tracking target is adjusted.

* * * * *